United States Patent [19]

Drakos

[11] Patent Number: 5,720,238
[45] Date of Patent: Feb. 24, 1998

[54] SPRING OPERATED SQUIRREL PROOF BIRD FEEDER

[76] Inventor: Louis J. Drakos, 545 Lake Louise Cir., Unit 201, Naples, Fla. 34110

[21] Appl. No.: 708,398

[22] Filed: Sep. 4, 1996

[51] Int. Cl.⁶ .................................................. A01K 39/01
[52] U.S. Cl. ............................................................ 119/57.9
[58] Field of Search ............................. 119/57.9, 52.3, 119/52.4

[56] References Cited

U.S. PATENT DOCUMENTS

| | | | |
|---|---|---|---|
| 4,541,362 | 9/1985 | Dehls | 119/57.9 |
| 4,646,686 | 3/1987 | Furlani | 119/57.9 |
| 5,156,112 | 10/1992 | Brown | 119/57.9 |
| 5,163,382 | 11/1992 | Morrison | 119/57.9 |
| 5,195,459 | 3/1993 | Ancketill | 119/57.9 |
| 5,375,558 | 12/1994 | Drakos | 119/57.9 |

*Primary Examiner*—Gene Mancene
*Assistant Examiner*—Yvonne R. Abbott
*Attorney, Agent, or Firm*—McCormick, Paulding & Huber

[57] ABSTRACT

A squirrel proof bird feeder comprises inner and outer housing with the inner housing fixed vertically and with the outer housing telescopically received thereabout and moveable between upper and lower positions. The housings have openings which are aligned and which provide through openings serving as feed ports in the upper position of the outer housing. In the lower position of he outer housing, the openings are misaligned and close the feed ports. The outer housing is also provided with springs biasing the some toward the upper position but allowing the housing to move downwardly to the lower position under the weight of a squirrel.

9 Claims, 2 Drawing Sheets

SPRING OPERATED SQUIRREL PROOF BIRD FEEDER

BACKGROUND OF THE INVENTION

There have been numerous attempts over the years to design a bird feeder which is truly squirrel proof. Certain of the feeders available may be designed for a specific purpose or installation and may be relatively squirrel proof when so used. As a general purpose bird feeder, however, such designs have proven inadequate. Conversely, general purpose bird feeders have been found lacking with regard to their squirrel proof function.

It is the general purpose of the present invention to provide an improved bird feeder of desirably simple and economic construction which is truly squirrel proof and which is adapted to a wide variety of uses so as to be fairly characterized as a general purpose bird feeder.

SUMMARY OF THE INVENTION

In fulfillment of the foregoing object, a spring operated squirrel proof bird feeder is provided with first and second housings telescopically related in a substantially vertical direction. The inner housing has an associated means for supporting the same substantially in a fixed position vertically. Preferably, the supporting means carries the inner housing in depending relationship and may itself be suspended from a tree limb or the like in spaced relationship therebeneath.

The outer housing is vertically slidable on and about the inner housing between upper and lower positions. Each of the housings has at least one opening in a side wall with the openings in the two housings in substantially horizontal alignment and in communication so as to provide a through opening or "feed port" when the outer housing is in its upper position. With the outer housing in its lower position, the openings in the two housing are substantially misaligned horizontally and in substantial non-communication such that no significant through opening or "feed port" exists. A bottom wall is provided in the inner housing to support bird seed and the like therewithin for access through the port or openings when the latter are in communication. A tension spring operatively connected with the outer housing urges the same toward its upper position. The spring means is selected so as not to be overcome by the weight of an average or typical bird to be fed but can be readily overcome by the weight of an average or typical squirrel. Thus, a squirrel on the outer housing will cause the latter to move to its lower position and close the feed port or through opening.

Preferably there are a plurality of pairs of co-operating openings in the two housing for opening and closing operation as aforesaid respectively with the outer housing in its upper and lower positions. Further, a pair of tension springs are provided in accordance with the presently preferred practice and each spring is supported in tension at opposite ends between brackets fixed relative to the inner and outer housings. As mentioned, the springs are selected to maintain the outer housing in its upper position despite the weight of a small bird on the housing but, the spring biasing force is insufficient to sustain the weight of a squirrel on the outer housing whereupon the housing descends to its lower position and the ports or feed openings are closed.

DESCRIPTION OF PREFERRED EMBODIMENTS

Figure 1:
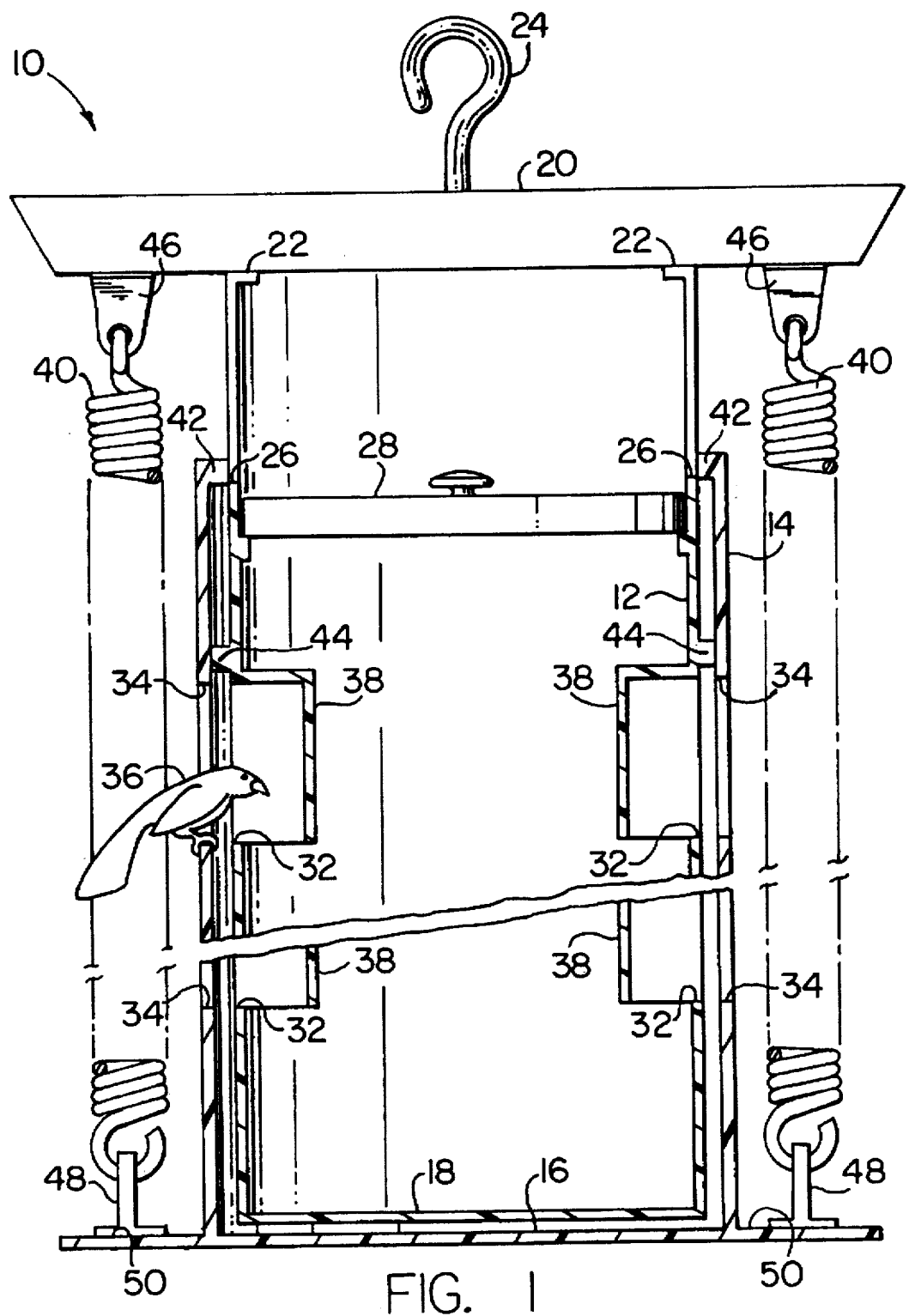
FIG. 1 of the drawings is a fragmentary vertical section through the improved bird feeder of the present invention with the outer housing shown in its upper position and the tension spring in equilibrium.
Figure 2:
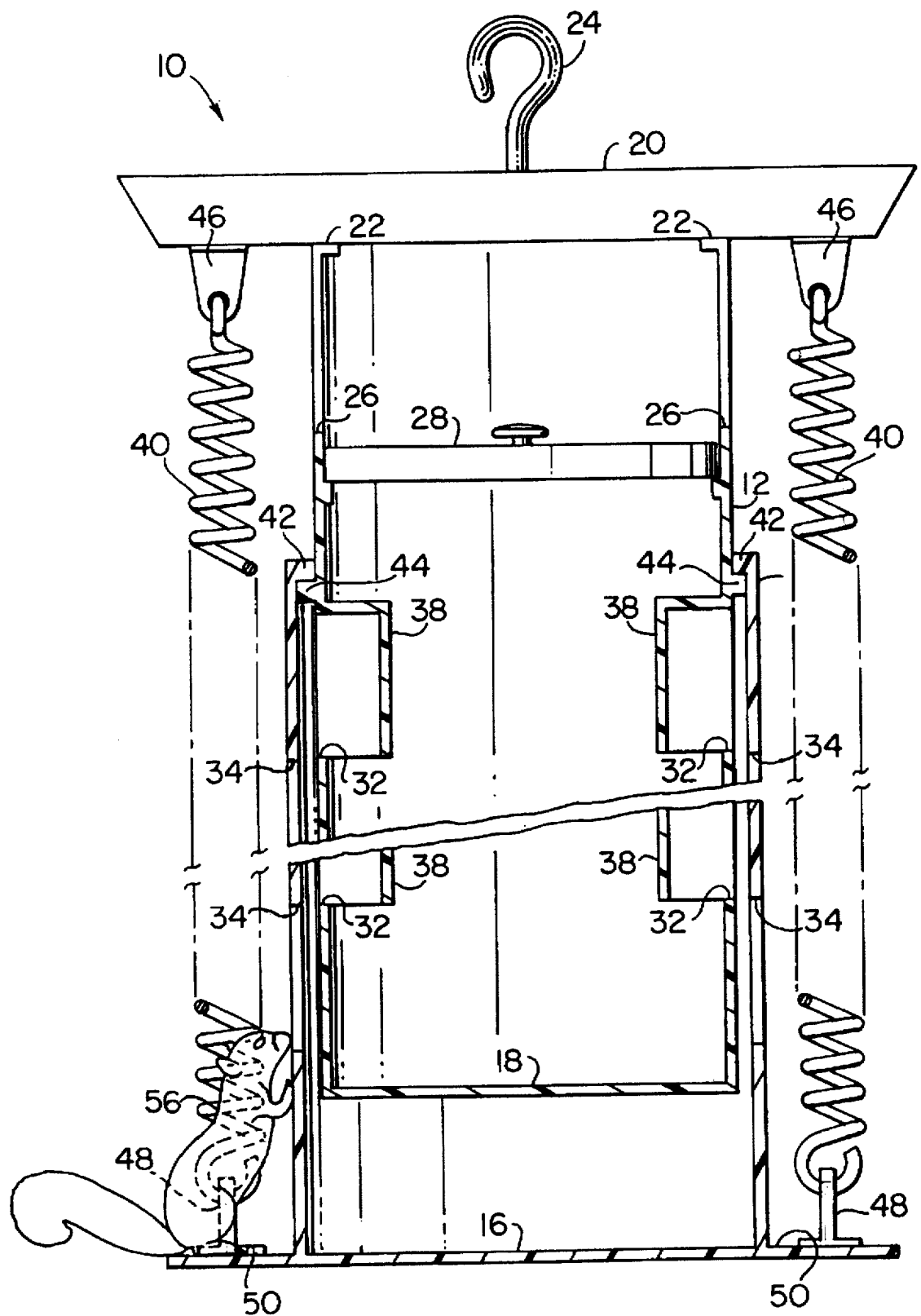
FIG. 2 is a fragmentary vertical section similar to FIG. 1 but showing the outer housing in its lower position, the tension spring being extended.

Referring to FIGS. 1 and 2 an improved bird feeder constructed in accordance with the present invention is indicated generally at 10 and comprises first and second or inner and outer housings 12,14 in telescopic relationship in a substantially vertical direction. That is, the inner housing 12 is fixed vertically while the outer housing 14 is moveable vertically relative thereto and thereabout. In FIG. 1, the outer housing 14 is shown in a first or upper position and in FIG. 2 the housing is illustrated in its second or lower position. Preferably and as illustrated, the housings 12 and 14 each take a hollow generally cylindrical configuration viewed vertically. A support means for the inner housing 12 may vary widely within the scope of the present invention and may comprise an upstanding post, for example, with an opening in a bottom wall 16 of the outer housing receiving the same for connection with a bottom wall 18 of the inner housing. Preferably, however, an upper support member 20 is provided and may take a circular configuration somewhat larger in diameter than the diameter of the inner housing 12. Thus, with the inner housing 12 attached at 22, 22 to the support member 20, the other portion of the member 20 extends horizontally substantially beyond the peripheral surface of the housing 12 as shown. A connecting means may be provided as in the form of a hook 24 for suspending the support member 20 and thus the bird feeder assembly in spaced relationship beneath a limb of a tree or the like. As illustrated, horizontal openings 26, 26 may be provided at an upper end portion of the inner housing 12 for ready access in introducing bird seed or the like to the interior of the housing. A removable top or cover 28 may also be provided at an upper end portion of the housing.

In accordance with the invention, at least one opening is provided in a side wall of each of the housings 12 and 14 and, as shown, a plurality of openings are provided in each of the housings four (4) shown at 32 and 34 respectively. That is, openings 32, 32 in the inner housing co-operate with openings 34, 34 in the outer housing 14. Pairs of openings 32, 34 serve as feed ports for birds as illustrated in FIG. 1. Thus, when the outer housing 14 is in its upper position, each pair of openings 32, 34 is in substantial horizontal alignment and in communication to provide through openings for ready access to the interior of inner housing 12 and bird seed or the like therein. As best illustrated in FIG. 1, a bird such as the small bird 36 may perch on a bottom edge of an opening 34 and thus readily access bird seed and the like through opening 34 and the corresponding opening 32. Hoods or hood-like members 38, 38 are preferably arranged within the inner housing 12 adjacent each of the openings 32, 32 to prevent leakage of bird seed and the like outwardly through the openings. As will be seen, each hood-like member 38 extends downwardly and about its associated opening 32 and opens downwardly adjacent a bottom portion of the opening for ready access to the bird seed.

Spring means for vertically biasing the outer housing 12 toward its upper position may vary in form but preferably comprises a pair of similar coil-tension springs 40, 40. The springs 40, 40 are supported at upper ends by suitable brackets 46, 46 and at lower ends by brackets 48, 48 mounted on an annular flange 50 at a lower end portion of the outer housing 14. Stops 42, 44 may also be provided respectively on the outer and inner housings 14, 12. Thus, a lowermost position of the outer housing 14 can be selectively established as illustrated in FIG. 2.

The springs 40, 40 are selected so as to allow birds of various sizes and weights to use the bird feeder without substantially displacing the outer housing 14. Thus, an average or typical bird weight may be experimentally or otherwise established. On the other hand, an average or typical weight for a squirrel such as the squirrel 56 in FIG. 2 will overcome the biasing force established by the springs causing the outer housing 14 to descend to its lower position of FIG. 2. In the lower position of FIG. 2, the openings 32, 34 are misaligned horizontally and in substantial non-communication as mentioned. No significant through opening exists thus rendering the squirrel impotent in his attempt to access the bird seed or the like. When the squirrel leaves his perch on the flange 50, the outer housing 14 will of course return to the upper position of FIG. 1.

As will be apparent from the foregoing, an improved bird feeder has been provided which is of a desirably simple design, which can be manufactured at economic advantage, and which is highly efficient in its operation and positively prevents squirrels from feeding on the bird seed or the like intended for small birds. The potential for maintenance free operation of the feeder and long service life will also be apparent.

I claim:

1. A spring operated squirrel proof bird feeder comprising first and second housings telescopically related in a substantially vertical direction, the inner housing having a support member attached thereto at an upper end portion and supporting the same in depending relationship therebeneath and projecting horizontally beyond both housings, said support member being adapted for suspension in spaced relationship beneath a tree limb or the like, and the outer housing being vertically slidable about the inner housing between upper and lower positions, each of said housings having at least one opening in a side wall thereof with the openings in said two housings in substantial horizontal alignment and in communication to provide a through opening when the outer housing is in its upper position, said openings being substantially misaligned horizontally and in substantial non-communication with no significant through opening when the outer housing is in its lower position, a bottom wall in said inner housing to support bird seed and the like therewithin for access through said two openings when the latter are in communication, and spring means operatively connected at a lower end with said outer housing and at an upper end said horizontally projecting support member and exerting a biasing force pre-selected so as not to be overcome by the weight of a bird but readily overcome by the weight of a squirrel on said outer housing causing the latter to move to its lower position and close said through openings.

2. A spring operated squirrel-proof bird feeder as set forth in claim 1, wherein a plurality of pairs of co-operating openings are provided in said two housings for opening and closing operation as aforesaid respectively with said outer housing at its upper and lower positions.

3. A spring operated squirrel-proof bird feeder as set forth in claim 2, wherein said inner housing is provided with a removable top.

4. A spring operated squirrel-proof bird feeder as set forth in claim 1, wherein said support member carries at least one bracket, and vertical spring has its upper end attached to said bracket with its other end attached to said outer housing.

5. A spring operated squirrel-proof bird feeder as set forth in claim 1, wherein a pair of similar springs are provided and similarly arranged.

6. A spring operated squirrel proof bird feeder as set forth in claim 5, wherein said outer housing is provided with a pair of outwardly projecting generally horizontal flanges at a lower end portion, and wherein said two springs are respectively attached at their lower end portions to said flanges.

7. A spring operated squirrel proof bird feeder as set forth in claim 6, wherein a bracket is provided on each of said flanges for attachment of a lower end of each said spring thereto.

8. A spring operated squirrel-proof bird feeder as set forth in claim 1, wherein said two housings are of hollow generally cylindrical configuration viewed vertically.

9. A spring operated squirrel-proof bird feeder as set forth in claim 1, wherein said inner housing is provided with an internal hood-like member adjacent said opening therein to prevent leakage of bird seed outwardly through the opening, said hood-like member extending downwardly and about the opening from a top portion thereof, and having an open end facing downwardly adjacent a bottom portion of the opening.

* * * * *

UNITED STATES PATENT AND TRADEMARK OFFICE
CERTIFICATE OF CORRECTION

PATENT NO. : 5,720,238
DATED : February 24, 1998
INVENTOR(S) : Louis Drakos

It is certified that error appears in the above-indentified patent and that said Letters Patent is hereby corrected as shown below:

Column 4:

Claim 1: Line 4, after "and", delete "at" and insert --having--.

Line 5, after "end", insert --connected to--.

Claim 4: Line 20, after "and", insert --wherein a--.

Signed and Sealed this

Eleventh Day of April, 2000

Attest:

Q. TODD DICKINSON

Attesting Officer

Director of Patents and Trademarks